US012702093B2

(12) United States Patent
Lenfert et al.

(10) Patent No.: US 12,702,093 B2
(45) Date of Patent: Aug. 11, 2026

(54) RIDING ELECTRIC WORK MACHINE WITH SWING ARM TRACTION

(71) Applicant: HONDA MOTOR CO., LTD., Tokyo (JP)

(72) Inventors: Nathaniel Artemis Lenfert, Graham, NC (US); Travis Barkey, Greensboro, NC (US); Christopher W. Vaughn, Mebane, NC (US); Scott J. Kaskawitz, Hillsborough, NC (US)

(73) Assignee: HONDA MOTOR CO., LTD., Tokyo (JP)

( * ) Notice: Subject to any disclaimer, the term of this patent is extended or adjusted under 35 U.S.C. 154(b) by 384 days.

(21) Appl. No.: 18/367,562

(22) Filed: Sep. 13, 2023

(65) Prior Publication Data

US 2024/0122101 A1 Apr. 18, 2024

Related U.S. Application Data

(60) Provisional application No. 63/416,028, filed on Oct. 14, 2022.

(51) Int. Cl.

| | |
|---|---|
| ***A01D 67/00*** | (2006.01) |
| ***A01D 34/00*** | (2006.01) |
| ***A01D 69/02*** | (2006.01) |
| ***B60G 3/14*** | (2006.01) |
| ***B60G 7/02*** | (2006.01) |
| *A01D 101/00* | (2006.01) |
| *B60L 15/20* | (2006.01) |
| *B60L 50/60* | (2019.01) |

(52) U.S. Cl.

CPC ........... *A01D 67/00* (2013.01); *A01D 34/008* (2013.01); *A01D 69/02* (2013.01); *B60G 3/14* (2013.01); *B60G 7/02* (2013.01); *A01D 2101/00* (2013.01); *B60G 2200/1324* (2013.01); *B60L 15/20* (2013.01); *B60L 50/60* (2019.02)

(58) Field of Classification Search

CPC ...... A01D 34/008; A01D 67/00; A01D 69/02; B60L 50/60; B60L 15/20; B60L 2200/46; B60G 3/14; B60G 7/02; B60G 2200/1324; B60K 7/007; B60K 7/0007

See application file for complete search history.

(56) References Cited

U.S. PATENT DOCUMENTS

| | | | | |
|---|---|---|---|---|
| 3,575,441 A * | 4/1971 | Arning | B60G 9/00 280/124.165 |
| 6,711,885 B2 * | 3/2004 | Ferris | A01D 34/64 56/15.8 |
| 7,017,327 B2 | 3/2006 | Hunt et al. | |

(Continued)

FOREIGN PATENT DOCUMENTS

JP 5401686 B2 1/2014

OTHER PUBLICATIONS

Andro et al.; Jul. 29, 2021; Self-Moving Device (Year: 2021).*

*Primary Examiner* — Alicia Torres
(74) *Attorney, Agent, or Firm* — WHDA, LLP

(57) ABSTRACT

A riding-type electric work machine including a vehicle body frame, an electrically driven operating unit, a swing arm swingably supported by the vehicle body frame, a traction motor held by the swing arm, a battery and a suspension coupled to the swing arm. The swing arm includes a housing base enclosing the traction motor and an arm connecting the housing base to the swing shaft.

22 Claims, 7 Drawing Sheets

(56) References Cited

U.S. PATENT DOCUMENTS

| | | | | |
|---|---|---|---|---|
| 7,918,305 | B2 | 4/2011 | Scherbring et al. | |
| 8,191,342 | B2 * | 6/2012 | Ishii | A01D 34/66 56/320.1 |
| 8,275,506 | B1 * | 9/2012 | Bishel | G05D 1/0242 701/25 |
| 9,090,142 | B2 * | 7/2015 | Lee | B60K 17/043 |
| 9,834,214 | B2 * | 12/2017 | Fukudome | B60L 7/14 |
| 10,029,551 | B2 * | 7/2018 | Ito | H01M 10/6551 |
| 10,034,429 | B2 | 7/2018 | Zheng et al. | |
| 2014/0014425 | A1 * | 1/2014 | Yamanaka | B60G 21/051 180/65.51 |

* cited by examiner

TOP
BOTTOM
130
100L
16L
16R
26
120
24
22
134
132
40L
60L
91
20
12
30a
30b
FRONT
REAR
14R
14L
10
RIGHT
LEFT
32R
32L

RIGHT
LEFT
REAR
FRONT
130
120
54R
100R
62
40R
58R
50R
60
59
56R
52R
66R
91
80
92
84
72
70
90R
134
132
110c
30c
110b
30b
C
13R
12
M3
M1
M2
54L
100L
40L
58L
50L
56L
52L
66L
90L
110a
30a
13L
20

12
16R
13L
16L
100L
101
94L
102
68L
50L
52L
40L
66L
70
80
91
FRONT
REAR 100L
102
101
50L
94L
54L
92
84
86
56L
X
RIGHT
LEFT
52L
90L
74
76
78
REAR
FRONT
80
82
91
TOP
BOTTOM

FIG. 6

130
50L
40L
52L
40L
90L
D1
D2
FRONT
REAR
14L

TOP
BOTTOM
FRONT
REAR
RIGHT
LEFT
160
170
172
174
130
100L
16L
16R
26
120
134
132
40L
66L
24
22
91
20
30a
30b
12
14R
14L
32R
32L

RIDING ELECTRIC WORK MACHINE WITH SWING ARM TRACTION

CROSS REFERENCES TO RELATED APPLICATIONS

The present application claims priority under 35 U.S.C. § 119 to Provisional Patent Application No. 63/416,028, filed Oct. 14, 2022, entitled "RIDING-TYPE ELECTRIC WORK MACHINE," which is incorporated herein by reference in its their entirety.

TECHNICAL FIELD

The present disclosure relates to a riding-type electric work machine that travels on electric power and operates on electric power.

BACKGROUND

A riding-type electric work machine travels on electric power. In addition, such a riding-type electric work machine includes an operating unit that operates on electric power. The operating unit is, for example, a lawn mower. In this case, the riding-type electric work machine is an electric lawn mower.

SUMMARY

An occupant (an operator) rides such a riding-type electric work machine. For example, the occupant sits on a seat and operates the riding-type electric work machine so as to perform lawn mowing or the like. Consequently, there is a need for the riding-type electric work machine to have a comfortable ride quality.

According to an aspect of the present disclosure, a riding-type electric work machine includes a vehicle body frame, an electrically driven operating unit supported by the vehicle body frame, a swing arm supported by the vehicle body frame through a swing shaft. A traction motor held by the swing arm, a battery configured to supply electric power to the traction motor and the operating unit, and a suspension coupled to the swing arm and the vehicle body frame. The swing arm includes a mounting base attached to the traction motor and an arm connecting the housing base to the swing shaft.

In the present disclosure, the swing arm holding a drive wheel is connected to the vehicle body frame by the suspension. The suspension expands and contracts in accordance with irregularities on the ground, so that a favorable ride quality can be obtained.

In the above configuration, heavy components such as the traction motor and the battery are arranged close to the ground. Accordingly, the center of gravity of the riding-type electric work machine is lowered. Thus, the stability of the riding-type electric work machine is improved, especially when working on a slope. In addition, this further improves the ride quality of the riding-type electric work machine.

Since the traction motor is provided at the swing arm, the load on a portion below the suspension (an unsprung weight) is large. According to this configuration, the suspension is capable of favorably following the irregularities on the ground, and the fluctuations in the ground contact pressure of the drive wheel against the ground are reduced. Therefore, when the riding-type electric work machine travels, it is less likely that a track (a rut) of the drive wheel will be formed on the ground. In addition, braking of the traction motor may easily be transmitted to a travel control unit, so that control is stabilized.

Furthermore, an assembly (a movable part) including the swing arm and the traction motor can be formed with a small number of components. Therefore, the maintenance of the assembly may be easily performed.

BRIEF DESCRIPTION OF THE DRAWINGS

The advantages of the disclosure will become apparent in the following description taken in conjunction with the following drawings.

FIG. 6 is a schematic left side view illustrating a change in the wheel base between before and after the left swing arm swings.

DETAIED DESCRIPTION

In the following description, the left side and the right side respectively refer to the left side and the right side of an occupant sitting on a seat 26 of a riding-type electric work machine 10 illustrated in FIG. 1. A transverse direction is the same as a vehicular width direction. A longitudinal direction is the horizontal direction perpendicular to the vehicular width direction. The vertical direction is perpendicular to both the vehicular width direction and the vehicular longitudinal direction and is the same as a vehicular height direction.

Figure 1:
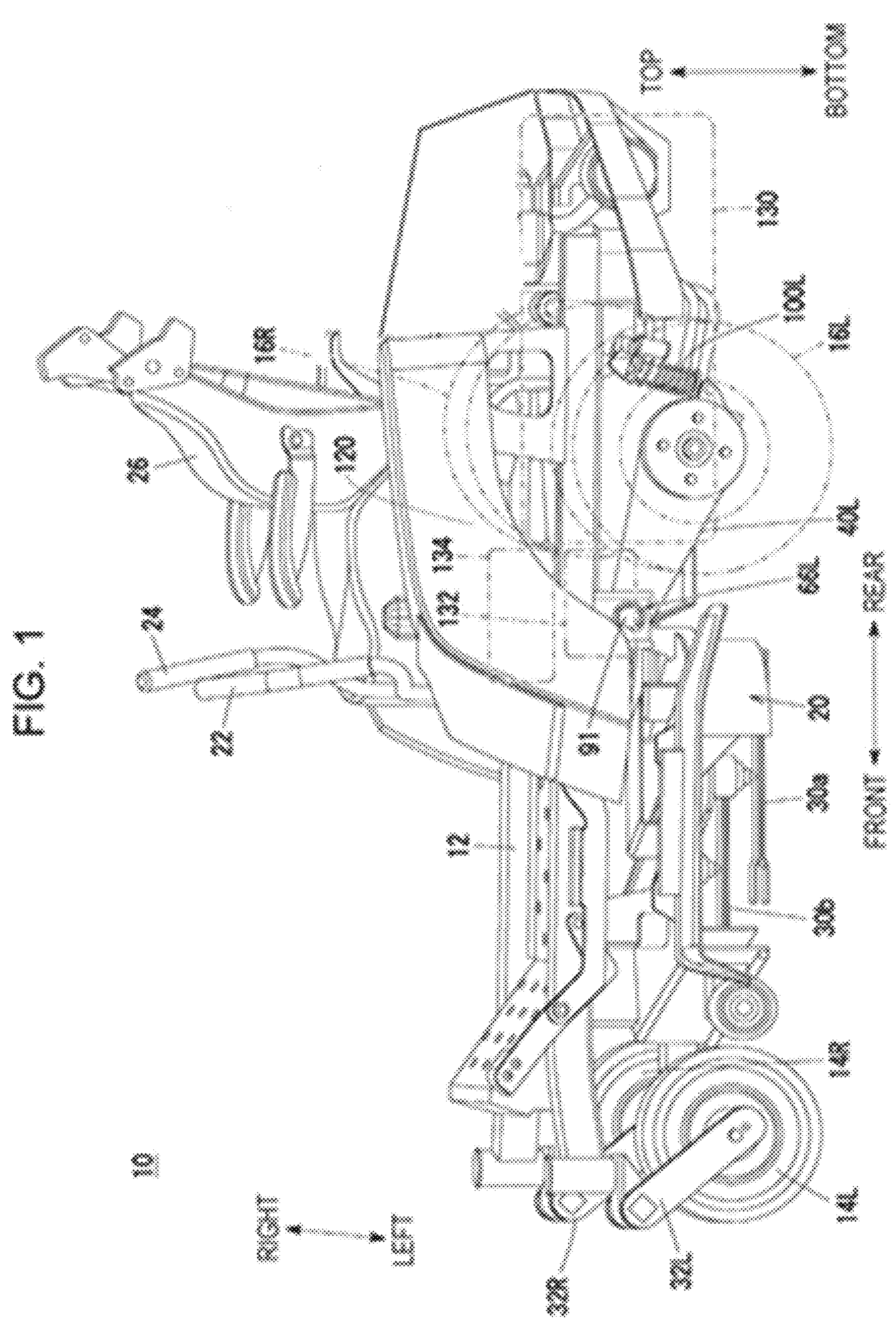
FIG. 1 is a schematic perspective view of a riding-type electric work machine according to a first embodiment of the present disclosure when viewed from the left side.
Figure 2:
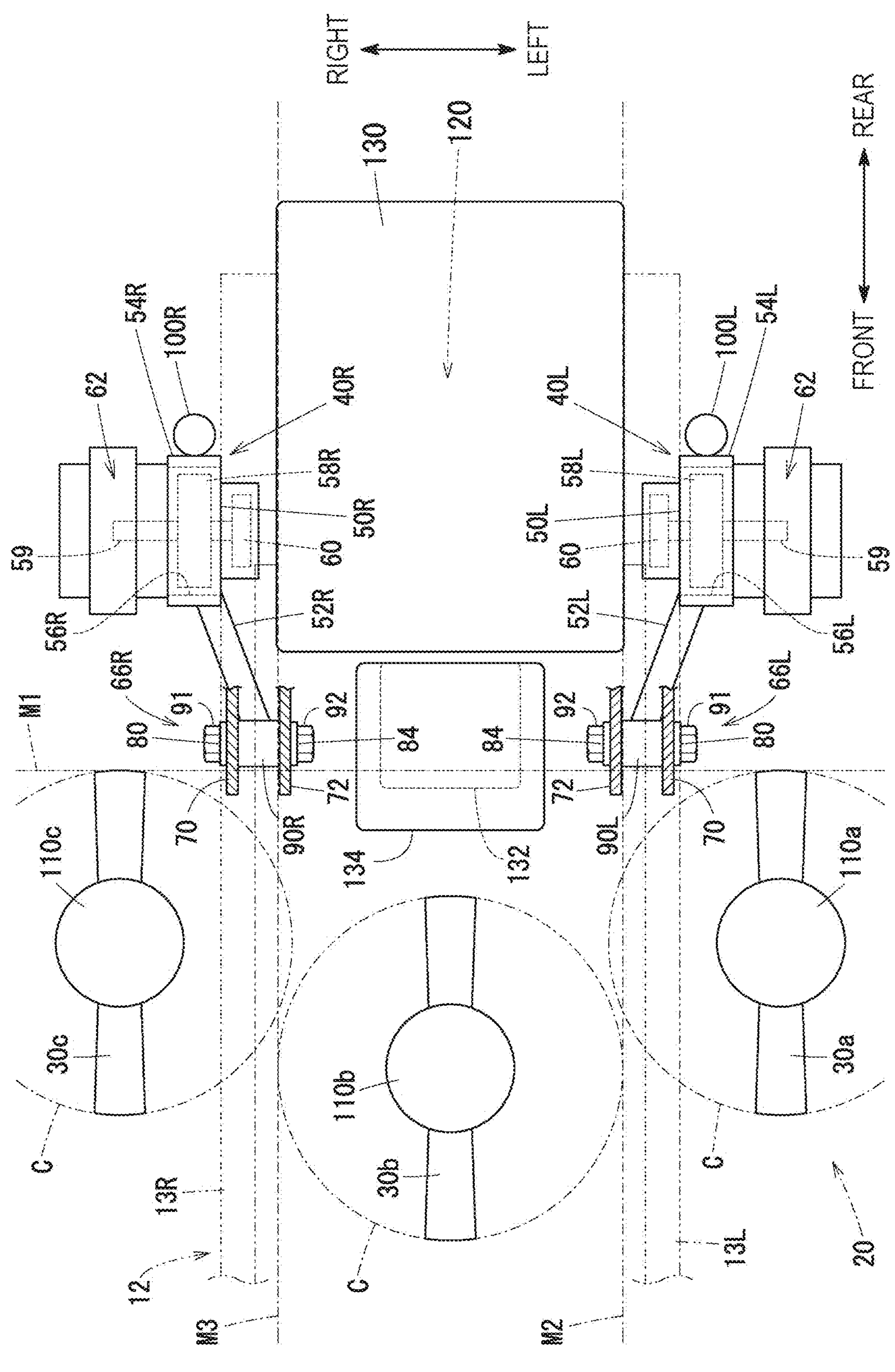
FIG. 2 is a schematic plan view schematically illustrating a principal portion when the riding-type electric work machine is viewed from above.

FIG. 1 is a schematic perspective view of the riding-type electric work machine 10 according to the first embodiment. The riding-type electric work machine 10 includes a vehicle body frame 12, a pair of front wheels (a left front wheel 14L and a right front wheel 14R), a pair of rear wheels (a left rear wheel 16L and a right rear wheel 16R), and a lawn mower deck 20 (an operating unit). As illustrated in FIG. 2, which schematically illustrates a principal portion of the riding-type electric work machine 10 when viewed from above, the lawn mower deck 20 is located between the pair of front wheels and the pair of rear wheels. In other words, the lawn mower deck 20 is positioned behind the pair of front wheels and in front of the pair of rear wheels.

As illustrated in FIG. 1, the riding-type electric work machine 10 includes a pair of control levers 22 and 24 and the seat 26. An occupant (an operator), which is not illustrated, sits on the seat 26 and operates the control levers 22 and 24. The riding-type electric work machine 10 travels forward or travels rearward in accordance with the user operation. Also, three blades 30*a* to 30*c* that are provided to the lawn mower deck 20 rotate or stop rotating.

The left front wheel 14L is connected to a vehicle body frame 12 by a left front fork 32L, and the right front wheel 14R is connected to the vehicle body frame 12 by a right front fork 32R. In contrast, as illustrated in FIG. 1 and FIG. 2, the left rear wheel 16L is connected to the vehicle body frame 12 by a left swing arm 40L and a left suspension 100L. The right rear wheel 16R is connected to the vehicle body frame 12 by a right swing arm 40R and a right suspension 100R (see FIG. 2). In this manner, the riding-type electric work machine 10 includes the pair of swing arms and the pair of suspensions. The pair of swing arms and the pair of suspensions form an independent suspension.

Figure 3:
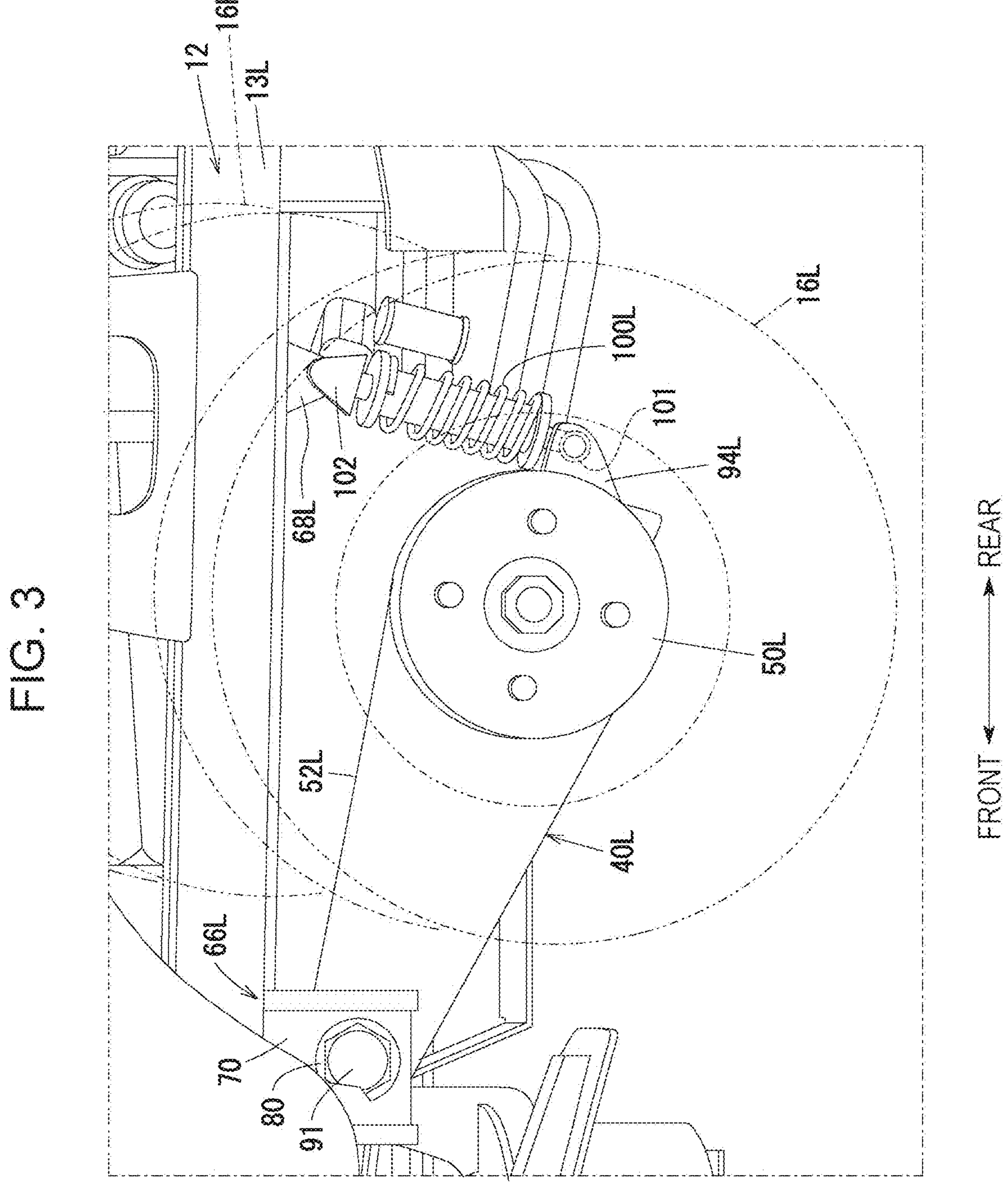
FIG. 3 is an enlarged view of a principal portion of FIG. 1.
Figure 4:
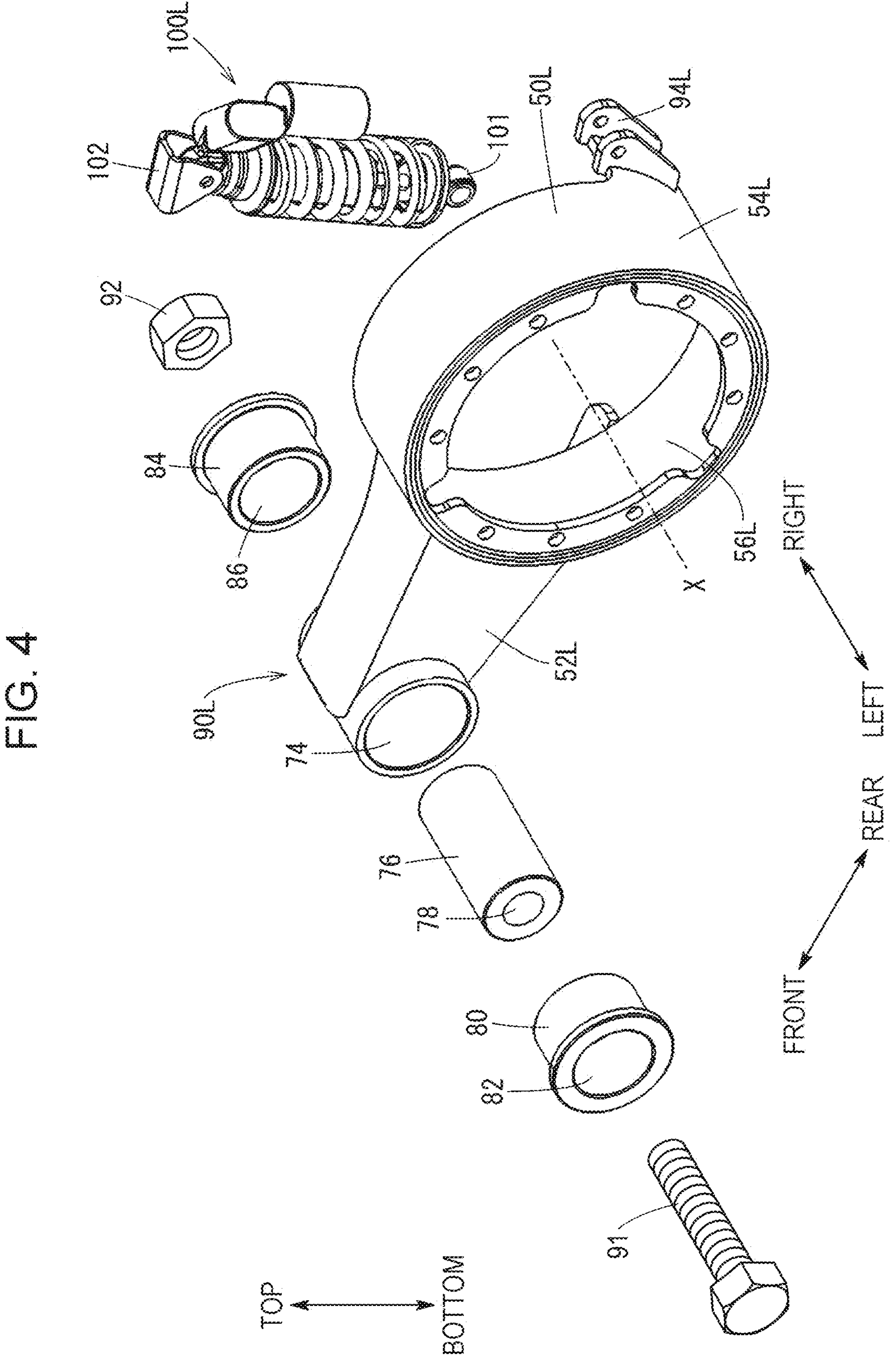
FIG. 4 is an exploded perspective view of a left swing arm that is one of a pair of swing arms and that is disposed on the left side of the riding-type electric work machine.
Figure 5:
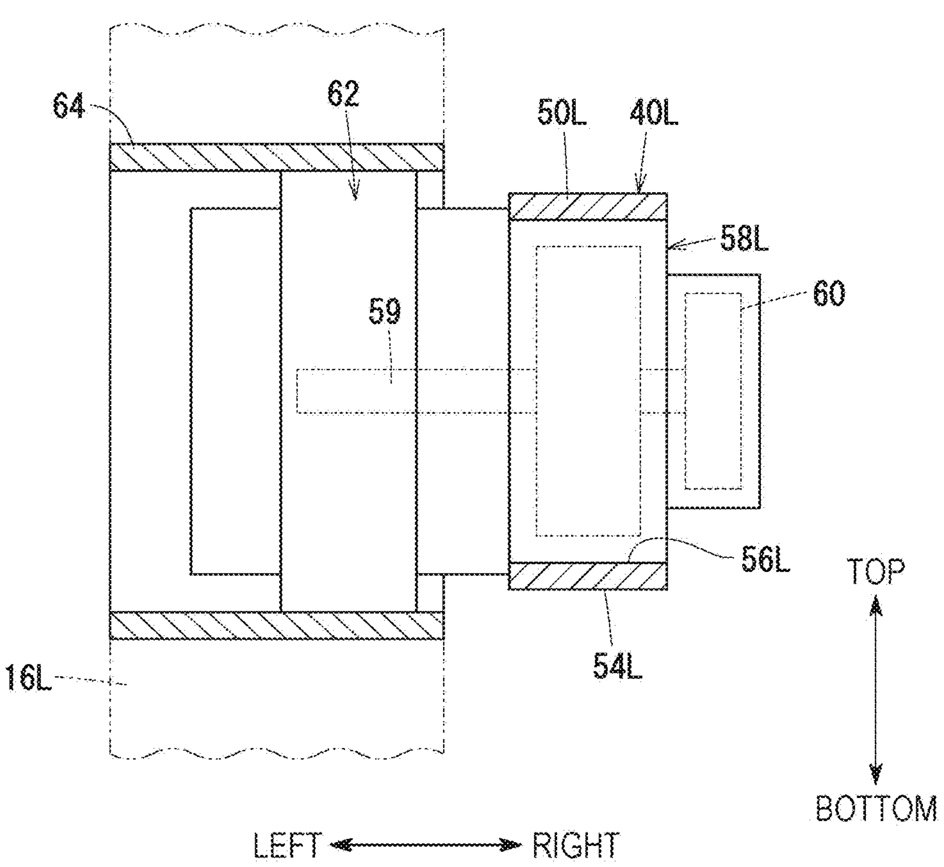
FIG. 5 is a schematic longitudinal sectional view of the vicinity of a left rear wheel when viewed in the rear-to-front direction.

The left rear wheel 16L will now be specifically described as an example. FIG. 3 is an enlarged view of a principal portion of FIG. 1, and FIG. 4 is an exploded perspective view of the left swing arm 40L. FIG. 5 is a schematic longitudinal sectional view of the vicinity of the left rear wheel 16L when viewed in the rear-to-front direction. The left swing arm 40L includes a left housing base 50L, a left arm 52L, and a left swing shaft 90L. The left housing base 50L has a cylindrical shape. An axial direction X of the left housing base 50L extends along the vehicular width direction. The left arm 52L extends substantially forward from a portion of an outer wall of the left housing base 50L. In other words, the left arm 52L extends in a direction crossing the axial direction X of the left housing base 50L (the vehicular width direction).

As illustrated in FIG. 4 and FIG. 5, the left housing base 50L has a left outer wall 54L and a left accommodation hole 56L. The left accommodation hole 56L is formed as a hollow portion surrounded by the left outer wall 54L. At least a portion of the left outer wall 54L extends along the vehicular width direction. Thus, the left accommodation hole 56L has a sufficient capacity.

A left traction motor 58L illustrated in FIG. 5 is accommodated in the left accommodation hole 56L. The left traction motor 58L includes a rotor and a drive shaft 59 to which the rotor is fixed. A brake 60 is provided at an inner end portion of the drive shaft 59, the inner end portion facing inward in the vehicular width direction. The brake 60 can reduce the speed at which the drive shaft 59 rotates but is primarily used to prevent unintended movement when the work machine is parked. A speed reducer 62 is provided at an outer end portion of the drive shaft 59, the outer end portion facing outward in the vehicular width direction. In other words, the speed reducer 62 is coupled to the left traction motor 58L. The speed reducer 62 outputs a driving force based on rotation of the drive shaft 59 via a gear train (not illustrated). The speed reducer 62 is covered with a left rear wheel 64. The left rear wheel 64 is covered with the left rear wheel 16L. Thus, at least a part of a unit that is formed of the speed reducer 62 and the left traction motor 58L is disposed inside the left rear wheel 16L, which is a drive wheel.

As described above, travelling components such as the left traction motor 58L, the speed reducer 62, and the brake 60 are gathered in a left rear portion of the riding-type electric work machine 10. When the above-mentioned gear train rotates along with the drive shaft 59, the left rear wheel 64 and the left rear wheel 16L rotates along with the gear train.

As illustrated in FIG. 3, a portion of a left part 13L of the vehicle body frame 12, the portion facing downward, includes a left arm connector 66L and a left frame side connector 68L. The left arm connector 66L is located in front of the left frame side connector 68L.

As illustrated in FIG. 2, the left arm connector 66L includes a pair of tabs 70 and 72. The pair of tabs 70 and 72 each have a through hole (not illustrated). As illustrated in FIG. 4, the left swing shaft 90L is provided integrally with a front end of the left arm 52L.

The left swing shaft 90L has a first insertion hole 74 extending in the vehicular width direction. An outer bush 80 and inner bush 84 are inserted in the first insertion hole 74 on opposite sides of the hole. The left swing shaft 90L is interposed between the pair of tabs 70 and 72. In this case, the insertion holes 82 and 86 formed in the outer bush 80 and inner bush 84 are aligned with the through holes of the tabs 70 and 72. A left end portion of the collar 76 in the axial direction of the collar 76 is inserted in the second insertion hole 82 of the outer bush 80. A right end portion of the collar 76 in the axial direction is inserted in the third insertion hole 86 of the inner bush 84.

A bolt 91 passes through the insertion hole 78 of the collar 76. A nut 92 is screwed onto the bolt 91. This prevents the left swing shaft 90L from coming off from between the tabs 70 and 72. As a result, the left arm 52L is connected to the vehicle body frame 12 by the left swing shaft 90L.

As illustrated in FIG. 3 and FIG. 4, a left housing base side connector 94L is provided at a portion of the left outer wall 54L of the left accommodating unit 50L, the portion facing rearward. The left housing base side connector 94L projects from the left outer wall 54L toward the side opposite to the side on which the left arm 52L is located.

As illustrated in FIG. 3, a lower end portion 101 of the left suspension 100L is coupled to the left housing base side connector 94L. An upper end portion 102 of the left suspension 100L is coupled to the left frame side connector 68L. As a result, the left housing base 50L is connected to the vehicle body frame 12 by the left suspension 100L. As described above, in the first embodiment, the left swing arm 40L is connected to the vehicle body frame 12 by the bolt 91 passing through the first insertion hole 74 of the left swing shaft 90L and by the left suspension 100L. The left swing arm 40L is supported by the vehicle body frame 12 through the left swing shaft 90L. As a result, the left traction motor 58L (see FIG. 5) accommodated in the left housing base 50L is held by the vehicle body frame 12. Similarly, the brake 60 and the speed reducer 62 are also held by the vehicle body frame 12.

As illustrated in FIG. 2, the right swing arm 40R and the left swing arm 40L are arranged at mirror symmetrical positions, and their shapes are also mirror symmetric. Accordingly, the right swing arm 40R will be only briefly described, and detailed illustration and detailed description thereof will be omitted.

The right swing arm 40R includes a right housing base 50R and a right arm 52R. The right housing base 50R has a right outer wall 54R and a right accommodation hole 56R, which is formed as a hollow portion surrounded by the right outer wall 54R. At least a portion of the right outer wall 54R extends along the vehicular width direction. Thus, the right accommodation hole 56R has a sufficient capacity.

A right traction motor 58R is accommodated in the right accommodation hole 56R. The drive shaft 59 of the right traction motor 58R is provided with the brake 60 and the speed reducer 62. A gear train of the speed reducer 62 is covered with a right rear wheel (not illustrated), and the right rear wheel is covered with the right rear wheel 16R (see FIG. 1). Thus, at least a part of a unit that is formed of the speed reducer 62 and the right traction motor 58R is disposed inside the right rear wheel 16R, which is a drive wheel.

As described above, travelling components such as the right traction motor 58R, the speed reducer 62, and the brake 60 are gathered in a right rear portion of the riding-type electric work machine 10. When the gear train of the speed reducer 62 rotates along with the drive shaft 59 of the right traction motor 58R, the right rear wheel and the right rear wheel 16R rotates along with this gear train.

A right housing base side connector that has a configuration similar to that of the left housing base side connector 94L is provided at a portion of the outer wall of the right housing base 50R, the portion facing rearward. A right arm connector 66R and a right frame side connector (not illustrated) are provided at a portion of a right part 13R of the vehicle body frame 12, the portion facing downward. The right arm connector 66R is located in front of the right frame side connector.

The lower end portion 101 of the right suspension 100R is coupled to the right housing base side connector 94R. The upper end portion 102 of the right suspension 100R is coupled to the right frame side connector. As a result, the right housing base 50R is connected to the vehicle body frame 12 by the right suspension 100R. In other words, the right swing arm 40R is connected to the vehicle body frame 12 by a right swing shaft 90R and the right suspension 100R. The right swing arm 40R is supported by the vehicle body frame 12 through the right swing shaft 90R. As a result, the right traction motor 58R accommodated in the right housing base 50R is held by the vehicle body frame 12. Similarly, the brake 60 and the speed reducer 62 are also held by the vehicle body frame 12.

The right arm 52R of the right swing arm 40R is connected to the right arm connector 66R by the bolt 91 passing through the right swing shaft 90R. This configuration is similar to that illustrated in FIG. 2, and thus, illustration and description thereof will be omitted.

In the above-described configuration, as illustrated in FIG. 2, the left arm 52L slants leftward in the front-to-rear direction (outward in the vehicular width direction). In contrast, the right arm 52R slants rightward in the front-to-rear direction (outward in the vehicular width direction). In this manner, the distance between the left arm 52L and the right arm 52R increases in the front-to-rear direction.

The lawn mower deck 20 is mounted on a lower portion of the vehicle body frame 12 that is located in front of the seat 26. The lawn mower deck 20 is provided with the three blades 30*a* to 30*c* (see FIG. 2) arranged in the vehicular width direction. The blade 30*b* positioned in the middle is disposed in front of the other blades 30*a* and 30*c*, which are respectively located at the left end and the right end.

Each of the three blades 30*a* to 30*c* is attached to a rotary shaft of a corresponding one of three drive motors 110*a* to 110*c*. The three blades 30*a* to 30*c* rotate along with rotations of the rotary shafts of the three drive motors 110*a* to 110*c*. In FIG. 2, the rotation ranges of the three blades 30*a* to 30*c* are represented by imaginary circles C. Each of the imaginary circles C is a circle that passes through a radial outer end of a corresponding one of the blades 30*a* to 30*c*. The blades 30*a* to 30*c*, which rotate, do not come into contact with the vehicle body frame 12.

The vehicle body frame 12 has an installation space 120 formed and defined by the left swing arm 40L, the right swing arm 40R, and the seat 26. As illustrated in FIG. 1, a battery 130, a first power drive unit (first PDU) 132, a second power drive unit (second PDU) 134 are installed in front of the installation space 120 and underneath the seat 26. Here, the first PDU 132 is a travel control unit that controls the left traction motor 58L and the right traction motor 58R. The second PDU 134 is an operating unit controller that controls the drive motors 110*a* to 110*c*, which causes the blades 30*a* to 30*c* to rotate.

The battery 130 supplies electric power to the left traction motor 58L, the right traction motor 58R, and the three drive motors 110*a* to 110*c*. The left traction motor 58L, the right traction motor 58R, and the three drive motors 110*a* to 110*c* are driven by the electric power supplied thereto. In response to the left traction motor 58L and the right traction motor 58R being driven, the left rear wheel 16L and the right rear wheel 16R rotate. As a result, the riding-type electric work machine 10 travels. In response to the three drive motors 110*a* to 110*c* being driven, the three blades 30*a* to 30*c* rotate. As a result, a lawn mowing operation is performed. As described above, the riding-type electric work machine 10 travels on electric power and operates on electric power.

Figure 6:
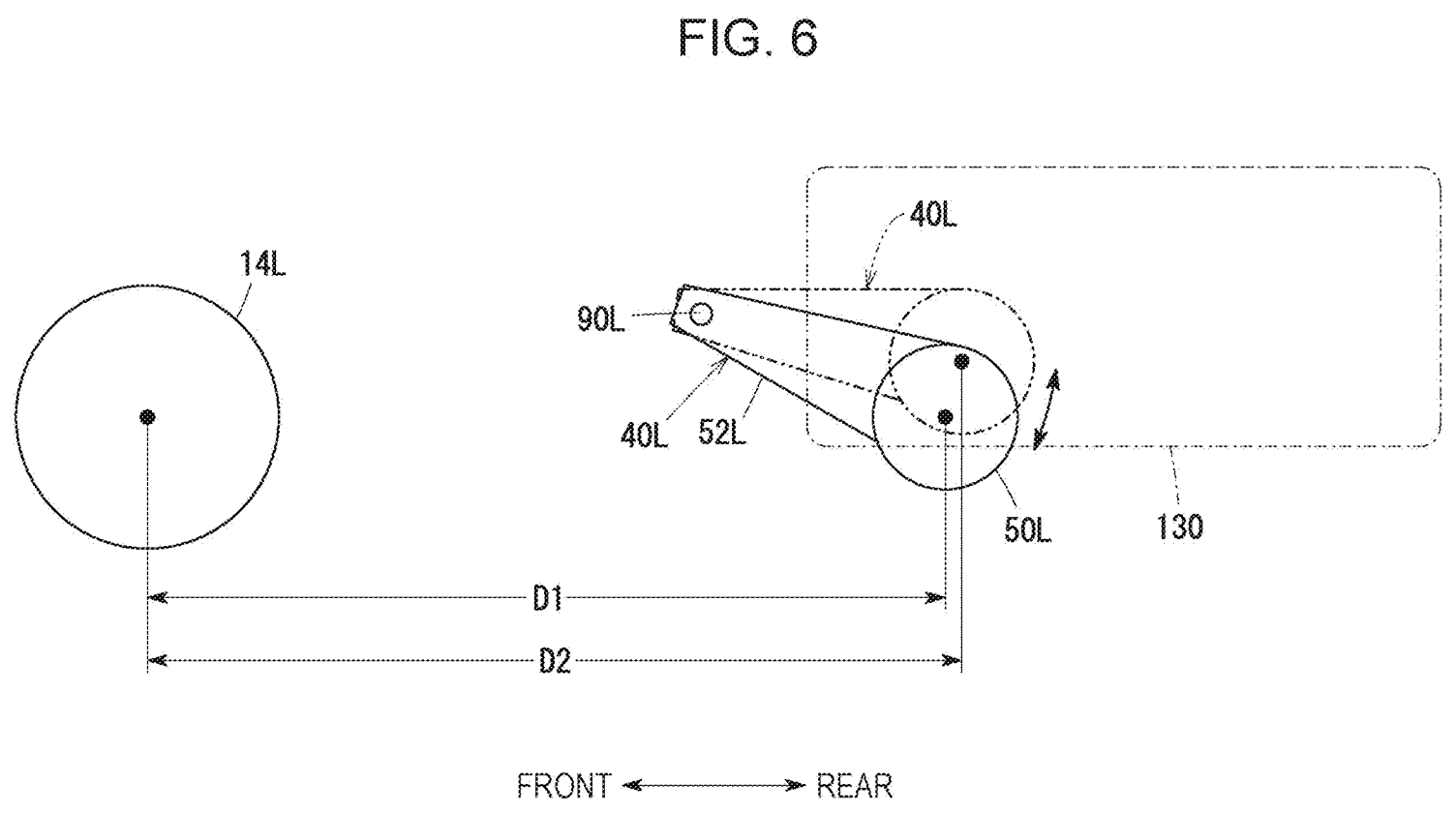

As illustrated in FIG. 2, the front end of the battery 130 is located between the left swing arm 40L and the right swing arm 40R. In FIG. 6, the left swing arm 40L and the right swing arm 40R when the left suspension 100L and the right suspension 100R expand to their maximum extent and the left rear wheel 16L and the right rear wheel 16R are located at their foremost positions (when the left swing arm 40L and the right swing arm 40R are located at the respective lowest positions within their movable ranges) are indicated by a solid line. In FIG. 6, the left suspension 100L and the right suspension 100R when the left suspension 100L and the right suspension 100R contract to their maximum extent and the left rear wheel 16L and the right rear wheel 16R are located at their rearmost positions (when the left swing arm 40L and the right swing arm 40R are located at upper ends within their movable ranges) are indicated by an imaginary line. Both when the left swing arm 40L and the right swing arm 40R are located at the upper ends within their movable ranges and when the left swing arm 40L and the right swing arm 40R are located at the respective lowest positions within their movable ranges, the battery 130 is sandwiched between the left swing arm 40L and the right swing arm 40R and protected by the installation space 120. In other words, the battery 130 is located between the left swing arm 40L and the right swing arm 40R even when the wheel base changes due to swinging of the left swing arm 40L and the right swing arm 40R.

Referring to, for example, FIG. 6 illustrating the left side surface, a wheel base D1 when the left rear wheel 16L is located at its foremost position is smaller than a wheel base D2 when the left rear wheel 16L is located at its rearmost position. Here, the wheel base D1 and the wheel base D2 are each the distance from the center of rotation of the left front wheel 14L to the center of rotation of the left rear wheel 16L (the center of the left housing base 50L).

As illustrated in FIG. 1, the battery 130 projects rearward in a lower portion of the riding-type electric work machine 10. The battery 130 projects downward from the vehicle body frame 12. In a side view of the riding-type electric work machine 10 along the vehicular width direction, the left frame side connector 68L and the right frame side connector included in the vehicle body frame 12 overlap the battery 130.

The first PDU 132 is positioned slightly in front of the battery 130. A large portion of the first PDU 132 is located between the left swing shaft 90L and the right swing shaft 90R and between the left arm 52L and the right arm 52R. The first PDU 132 is electrically connected to the left traction motor 58L and the right traction motor 58R by wiring lines (not illustrated). For example, control signals transmitted from the first PDU 132 to the left traction motor 58L and the right traction motor 58R flow through the wiring lines.

The second PDU 134 is disposed above the first PDU 132. In FIG. 1, the front end of the second PDU 134 is positioned in front of the front end of the first PDU 132. The second PDU 134 is electrically connected to the three drive motors 110*a* to 110*c* by wiring lines (not illustrated). For example, control signals transmitted from the second PDU 134 to the three drive motors 110*a* to 110*c* flow through the wiring lines.

The first PDU 132 and the second PDU 134 are arranged below the seat 26. The seat 26 is positioned substantially at the center of the riding-type electric work machine 10 in the vehicular longitudinal direction and positioned substantially at the center of the riding-type electric work machine 10 in the vehicular width direction. Accordingly, the first PDU 132 and the second PDU 134 are also positioned substantially at the center of the riding-type electric work machine 10 in the vehicular longitudinal direction and positioned substantially at the center of the riding-type electric work machine 10 in the vehicular width direction. In other words, the first PDU 132 and the second PDU 134 are gathered substantially at the center of the riding-type electric work machine 10.

As illustrated in FIG. 1, the bottom surface of the first PDU 132 and the bottom surface of the second PDU 134 are located above the bottom surface of the battery 130. In addition, the first PDU 132 and the second PDU 134 are located above the bottom surfaces of the blades 30*a* to 30*c*. When the blades 30*a* and 30*c* extend along the vehicular longitudinal direction, the front end of the first PDU 132 and the front end of the second PDU 134 are located above the rear ends of the blades 30*a* and 30*c*. In other words, in the side view of the riding-type electric work machine 10 along the vehicular width direction, a portion of the first PDU 132 and a portion of the second PDU 134 overlap the blades 30*a* and 30*c*. That is to say, as illustrated in FIG. 2, the first PDU 132 and the second PDU 134 are located above internal spaces defined by the rotation ranges (imaginary circles C) of the blades 30*a* and 30*c*.

FIG. 2 illustrates a state where the blades 30*a* and 30*c* extend along the vehicular longitudinal direction. In this case, an imaginary straight line passing the rearmost ends of the blades 30*a* and 30*c* will be referred to as an imaginary line M1. The front end of the first PDU 132 and the front end of the second PDU 134 are located in front of the imaginary line M1. Thus, as illustrated in FIG. 1, in the side view of the riding-type electric work machine 10 along the vehicular width direction, a portion of the first PDU 132 and a portion of the second PDU 134 are located above the rear ends of the blades 30*a* and 30*c* and overlap the rear ends of the blades 30*a* and 30*c*. In addition, as illustrated in FIG. 1, the rear end of the first PDU 132 and the rear end of the second PDU 134 are located between the left rear wheel 16L and the right rear wheel 16R. A large portion of the first PDU 132 is covered with the left swing shaft 90L, the left arm 52L, the right swing shaft 90R, and the right arm 52R.

FIG. 2 illustrates a state where the blade 30*b* extends along the vehicular longitudinal direction. In this case, an imaginary straight line passing the leftmost end of the outer circumferential edge of the imaginary circle C drawn by the blade 30*b* and extending parallel to the vehicular longitudinal direction will be referred to as an imaginary line M2. An imaginary straight line passing the rightmost end of the outer circumferential edge of the imaginary circle C drawn by the blade 30*b* and extending parallel to the vehicular longitudinal direction will be referred to as an imaginary line M3. When the riding-type electric work machine 10 is viewed in plan from above, the first PDU 132 and the second PDU 134 are located in an area between the imaginary line M2 and the imaginary line M3.

The riding-type electric work machine 10 according to the first embodiment is basically configured in the manner described above. Advantageous effects of the riding-type electric work machine 10 will now be described.

As described above, the left rear wheel 16L is connected to the vehicle body frame 12 by the left suspension 100L and the left swing shaft 90L (the bolt 91), and the right rear wheel 16R is connected to the vehicle body frame 12 by the right suspension 100R and the right swing shaft 90R (the bolt 91). When the left swing arm 40L and the right swing arm 40R are attached to the vehicle body frame 12, the left housing base 50L and the right housing base 50R, each of which has a cylindrical shape, are located on the outer side of the riding-type electric work machine 10 in the vehicular width direction. In other words, the left housing base 50L and the right housing base 50R will not be positioned further toward the inner side than the vehicle body frame 12 in the vehicular width direction. Thus, for example, a predetermined installation object can be installed in the installation space 120 surrounded by the vehicle body frame 12 and the seat 26. In other words, the installation space 120 can be effectively used.

The first PDU 132 and the second PDU 134 are gathered substantially at the center of the riding-type electric work machine 10. Thus, the lengths of the wiring lines connecting the first PDU 132 to the left traction motor 58L and the right traction motor 58R can be reduced as short as possible. Similarly, the lengths of the wiring lines connecting the second PDU 134 to the three drive motors 110*a* to 110*c* can be reduced as short as possible.

The entire first PDU 132 and the entire second PDU 134 are located behind the blade 30*b* and within the area of the imaginary circle C drawn by the blade 30*b* in the vehicular width direction. As a result, the installation space 120 can be effectively used. Therefore, a reduction in the size of the riding-type electric work machine 10 can be achieved.

When the riding-type electric work machine 10 travels, the electric power is supplied from the battery 130 to the left traction motor 58L and the right traction motor 58R. This causes the drive shafts 59 to rotate, and the gear trains of the speed reducers 62 rotate. As a result, the left rear wheel 16L and the right rear wheel 16R rotate. In response to this, the riding-type electric work machine 10 can travel. When there are irregularities on the ground, the left suspension 100L expands and contracts, and along with this, the left swing arm 40L swings about the left swing shaft 90L. Similarly, the right suspension 100R expands and contracts, and along with this, the right swing arm 40R swings about the right swing shaft 90R. As a result, as illustrated in FIG. 6, the left rear wheel 16L and the right rear wheel 16R move in accordance with the irregularities formed on the ground. Consequently, the drive wheels are held in a state of being in contact with the ground, and thus, the ride quality of the riding-type electric work machine 10 is improved.

The left swing shaft 90L is provided at the front end of the left arm 52L, and the right swing shaft 90R is provided at the front end of the right arm 52R. The left swing arm 40L is connected to the vehicle body frame 12 by the left housing base side connector 94L provided at the left housing base 50L, and the right swing arm 40R is connected to the vehicle body frame 12 by the right housing base side connector 94R provided at the right housing base 50R. Consequently, the swing distances of the left swing arm 40L and the right swing arm 40R are large. Therefore, a favorable cushioning property is obtained. Vibrations of the left rear wheel 16L, the left traction motor 58L, and so forth are reduced by the left swing arm 40L, and vibrations of the right rear wheel 16R, the right traction motor 58R, and so forth are reduced by the right swing arm 40R, so that vibration of the riding-type electric work machine 10 can be sufficiently suppressed.

In this case, heavy components such as the left traction motor 58L, the right traction motor 58R, and the battery 130 are arranged in a concentrated manner in the lower portion of the riding-type electric work machine 10. In other words, the heavy components are arranged close to the ground. In particular, the battery 130 is disposed between the left swing arm 40L and the right swing arm 40R. Thus, the center of gravity of the riding-type electric work machine 10 is lowered. Therefore, the stability of the riding-type electric work machine 10 especially on a slope is improved. In addition, as a result of the center of gravity of the riding-type electric work machine 10 being lowered, the ride quality of the riding-type electric work machine 10 is improved.

Since the left traction motor 58L is provided at the left rear wheel 16L, the load (the unsprung weight) below the left suspension 100L is large. Similarly, the unsprung weight below the right suspension 100R is large. According to this configuration, the suspensions are capable of favorably following the irregularities on the ground, and the fluctuations in the ground contact pressure against the ground are reduced. Therefore, when the riding-type electric work machine 10 travels, it is less likely that tracks (ruts) of the drive wheels will be formed on the ground.

In addition, the behaviors of the left and right traction motors 58L and 58R may easily be transmitted to the first PDU 132, and thus, control is stabilized.

Furthermore, in the side view of the riding-type electric work machine 10 along the vehicular width direction, the left frame side connector 68L of the vehicle body frame 12 coupled to the upper portion of the left suspension 100L and the right frame side connector of the vehicle body frame 12 coupled to the upper portion of the right suspension 100R are located at positions overlapping the battery 130. Thus, transmission of the weight of the battery 130 to the drive wheels in response to the reaction of the riding-type electric work machine 10 to the irregularities on the ground is suppressed. Consequently, the grip of the left and right rear wheels 16L and 16R, which are the drive wheels, is kept approximately constant. As a result, a slip due to a reduction in the grip of the drive wheels is prevented from occurring. In addition, tearing up of grass by its roots from the ground due to an increase in the grip of the drive wheels is prevented from occurring.

While the riding-type electric work machine 10 is travelling, the travelling direction of the riding-type electric work machine 10 may sometimes be changed. In this case, the riding-type electric work machine 10 turns. Here, in the riding-type electric work machine 10, the left arm 52L of the left swing arm 40L and the right arm 52R of the right swing arm 40R each slant outward in the vehicular width direction in the front-to-rear direction (see FIG. 2). Thus, the stability of the riding-type electric work machine 10 when the riding-type electric work machine 10 turns is improved.

The riding-type electric work machine 10 may sometimes travel toward the back of an occupant (travel rearward). In this case, a case may be assumed in which a structure of some kind comes into contact with the rear portion of the riding-type electric work machine 10. Here, the bottom surface of the first PDU 132 and the bottom surface of the second PDU 134 are located above the bottom surface of the battery 130. In addition, the battery 130 projects downward from the vehicle body frame 12 as it occupies the installation space 120. Thus, the installation space 120 comes into contact with the structure before the first PDU 132 and the second PDU 134 come into contact with the structure. In this manner, the first PDU 132 and the second PDU 134 are protected by the installation space 120 against the structure.

When lawn mowing is performed, electric power is supplied from the battery 130 to the drive motors 110*a* to 110*c*. As a result, the blades 30*a* to 30*c* rotate. Grass that is cut by the blades 30*a* to 30*c* is cut grass. Here, a case may be assumed in which sands are blown up from the ground due to the wind generated by rotations of the blades 30*a* to 30*c*. There is a possibility that the wind will carry the sands or the cut grass to the rear of the riding-type electric work machine 10.

In the first embodiment, the left arm 52L is located behind the lawn mower deck 20 and in front of the travelling components (the left traction motor 58L and the like) and the left suspension 100L. Thus, when the riding-type electric work machine 10 is viewed in the front-to-rear direction, the left arm 52L shields the travelling components, the left suspension 100L, and the like. Accordingly, the sands and the cut grass that flow from the lawn mower deck 20 toward the rear of the riding-type electric work machine 10 come into contact with the left arm 52L. Therefore, the sands and the cut grass are prevented from being attached to the travelling components, the left suspension 100L, and the like. As a result, the travelling components, the left suspension 100L, and the like are prevented from becoming contaminated by the sands or the cut grass, and thus, the maintenance of the riding-type electric work machine 10 is facilitated. The same applies to the right swing arm 40R.

Another case may also be assumed in which small stones on the ground are kicked up by the blades 30*a* to 30*c*. If two riding-type electric work machines 10 are operating while they are close to each other, it is possible that small stones kicked up by one of the riding-type electric work machines 10 will be thrown toward the side of the other riding-type electric work machine 10. In this case, the small stones will come into contact with, for example, the left swing arm 40L, the right swing arm 40R, the blade 30*a* or the blade 30*c*. As a result, the small stones are prevented from coming into contact with the first PDU 132 or the second PDU 134. The same applies to the case where a flying object other than small stones is thrown.

In the case where there is an unexpected obstacle (a stone, a structure, or the like) on the ground, the left swing arm 40L, the right swing arm 40R, the blade 30*a*, or the blade 30*c* comes into contact with the obstacle before the first PDU 132 and the second PDU 134 come into contact with the obstacle. As a result, the first PDU 132 and the second PDU 134 are protected against the obstacle. As described above, the first PDU 132 is located above the blades 30*a* and 30*c* so as to overlap the blades 30*a* and 30*c* and disposed between the left swing arm 40L and the right swing arm 40R, so that, the first PDU 132 can be protected against a flying object, an obstacle, or the like. In addition, since the second PDU 134 is disposed above the first PDU 132, the second PDU 134 can be protected against a flying object or an obstacle. Furthermore, a portion of the installation space 120 formed between the left swing arm 40L and the right swing arm 40R can be effectively used as a space in which the first PDU 132 and the second PDU 134 are arranged.

For example, when the travelling distance of the riding-type electric work machine 10 reaches a predetermined distance, the maintenance of travelling mechanisms including the travelling components is required. In this case, the travelling mechanisms are gathered at the left rear wheel 16L and the right rear wheel 16R. In the riding-type electric work machine 10, the left rear wheel 16L and the right rear wheel 16R each face outward in the vehicular width direction. In addition, assemblies (movable parts) including the swing arms and the travelling components can be formed with a small number of components. Therefore, the maintenance of the movable parts and the travelling mechanisms may be easily performed.

Furthermore, since the travelling components are gathered, a reduction in the size of each of the travelling mechanisms can be achieved.

The maintenance of the first PDU 132 or the second PDU 134 may sometimes be performed. In the case where the seat 26 is a tip-up seat, the first PDU 132 and the second PDU 134 become visible by tipping up the seat 26.

Alternatively, the first PDU 132 and the second PDU 134 become visible by detaching the seat 26. As described above, since a portion of the first PDU 132 and a portion of the second PDU 134 are located below the seat 26, the maintenance of the first PDU 132 or the second PDU 134 may be easily performed.

Figure 7:
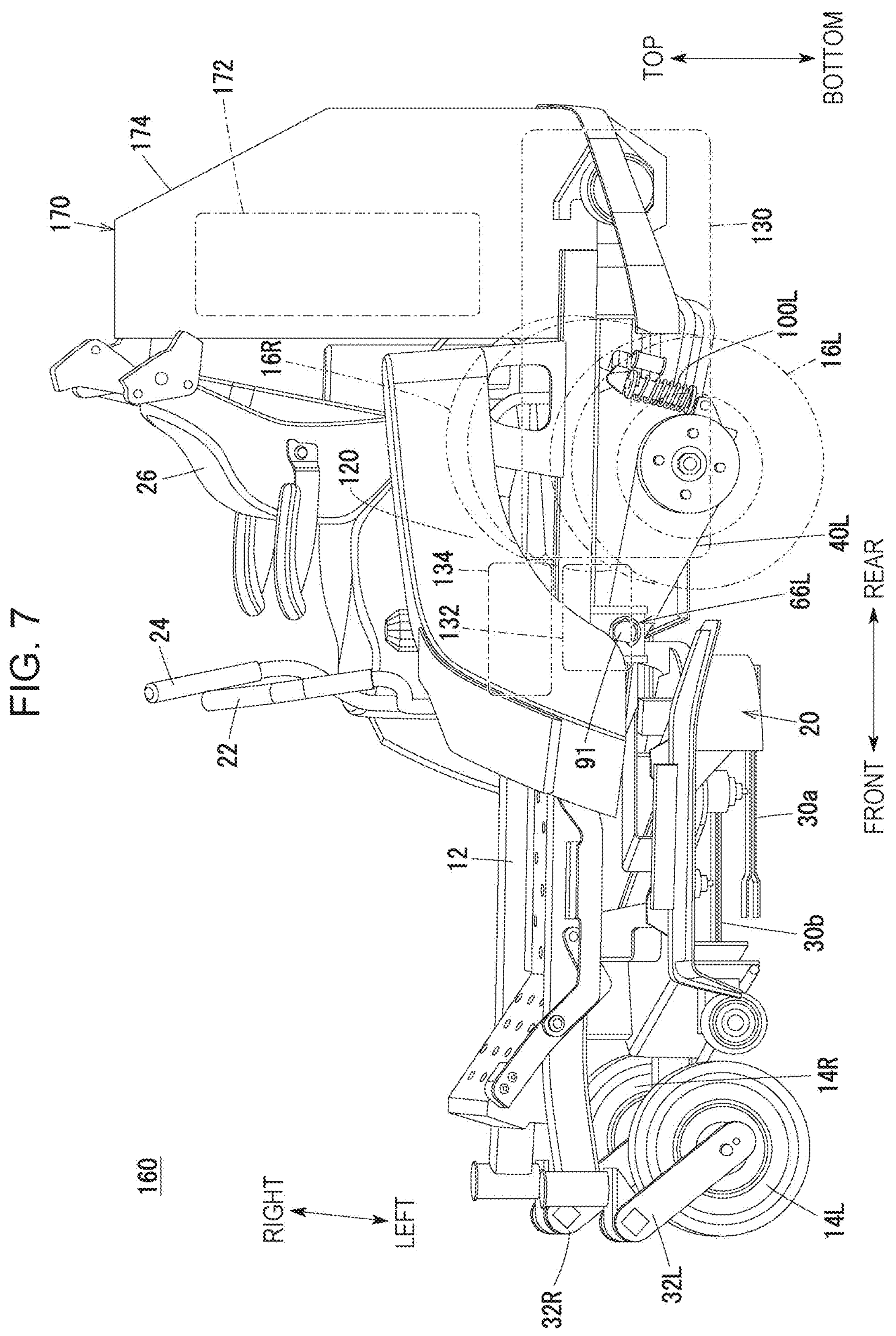
FIG. 7 is a schematic perspective view of a riding-type electric work machine according to a second embodiment of the present disclosure when viewed from the left side.

A riding-type electric work machine 160 according to a second embodiment will now be described with reference to FIG. 7. Note that components that are the same as the components illustrated in FIG. 1 to FIG. 6 are denoted by the same reference signs, and detailed descriptions thereof will be omitted.

The riding-type electric work machine 160 includes an autonomous control unit 170 that autonomously controls the left traction motor 58L, the right traction motor 58R, and the three drive motors 110*a* to 110*c*. The autonomous control unit 170 includes a control circuit 172 and a housing 174 in which the control circuit 172 is accommodated. The housing 174 is disposed at the rear of the riding-type electric work machine 160 so as to be located above the battery 130. If an autonomous function is an additional function to be added at a request of a user, the riding-type electric work machine 160 equipped with the autonomous control unit 170 can be easily configured by providing the housing 174 at the above-mentioned location.

The control circuit 172 includes a GPS receiver and stores map data. The control circuit 172 stores, for example, a travel path of the riding-type electric work machine 160 driven by an operator. In this case, the control circuit 172 controls the left traction motor 58L, the right traction motor 58R, and the three drive motors 110*a* to 110*c*, so that the riding-type electric work machine 160 travels along the stored travel path even when there is no operator riding on the riding-type electric work machine 160.

When the riding-type electric work machine 160 travels, the grip of the left rear wheel 16L and the grip of the right rear wheel 16R are respectively maintained by the left suspension 100L and the right suspension 100R. Thus, the left rear wheel 16L and the right rear wheel 16R are prevented from slipping or the like. Therefore, the probability that the actual travel path of the riding-type electric work machine 160 will deviate from the travel path input to (stored in) the autonomous control unit 170 due to slip or the like is reduced.

When the blades 30*a* to 30*c* cut grass, the cut grass, sands, or the like may sometimes be carried by wind to the rear of the riding-type electric work machine 160. Here, the autonomous control unit 170 is disposed at a relatively upper portion of the riding-type electric work machine 160. Consequently, it is unlikely that the cut grass, the sands, or the like will be blown up and will reach the housing 174. Thus, a failure of the control circuit 172 due to entry of the cut grass, the sands, or the like into the housing 174 is prevented from occurring.

Other advantageous effects similar to those of the first embodiment can also be obtained in the second embodiment.

As described above, the present embodiment discloses the riding-type electric work machine including the vehicle body frame (12), the electrically driven operating unit (20) supported by the vehicle body frame, the swing arms (40L, 40R) swingably supported by the vehicle body frame through the swing shafts (90L, 90R), the traction motors (58L, 58R) held by the swing arms, the battery (130) configured to supply electric power to the traction motors and the operating units, and the suspensions (100L, 100R) coupled to the swing arms and the vehicle body frame. The swing arms include the housing bases (50L, 50R) enclosing the traction motors and the arms (52L, 52R) connecting the housing bases to the swing shafts.

In the riding-type electric work machine, the swing arms holding the drive wheels are coupled to the vehicle body frame by the suspensions. The suspensions expand and contract in accordance with irregularities on the ground, and thus, a favorable ride quality can be obtained.

In the above configuration, heavy components such as the traction motors and the battery are arranged close to the ground. Accordingly, the center of gravity of the riding-type electric work machine is lowered. Thus, the stability of the riding-type electric work machine especially on a slope is improved. In addition, this further improves the ride quality of the riding-type electric work machine.

Since the traction motors are disposed at the swing arms, the load on a portion below each of the suspensions (the unsprung weight) is large. According to this configuration, the suspensions are capable of favorably following the irregularities on the ground, and the fluctuations in the ground contact pressure of the drive wheels against the ground are reduced. For such reasons, when the riding-type electric work machine travels, it is less likely that tracks (ruts) of the drive wheels will be formed on the ground. In addition, braking of the traction motors may easily be transmitted to the travel control unit, so that control is stabilized.

Furthermore, the assemblies (the movable parts) including the swing arms and the traction motors can be formed with a small number of components. Therefore, the maintenance of the movable parts and the travelling mechanisms may be easily performed.

The present embodiment discloses the riding-type electric work machine in which the swing arms include the pair of swing arms arranged at the left part (13L) and the right part (13R) of the vehicle body frame, in which the swing shafts and the housing bases are arranged at different positions in the vehicular longitudinal direction of the riding-type electric work machine, in which the arms extend from the swing shafts toward the housing bases, in which the battery projects downward from the vehicle body frame, and in which at least a portion of the battery is located between the pair of swing arms.

By arranging the battery at the above-mentioned position, the center of gravity of the riding-type electric work machine can be lowered. In addition, the pair of swing arms cover the left and right sides of the battery in the vehicular width direction, and thus, the battery can be protected against an obstacle (a structure), a flying object, and the like. Note that the flying object may be, for example, a small stone or the like hit and thrown by another work vehicle.

The present embodiment discloses the riding-type electric work machine including the speed reducers (62) each of which is disposed on the outer side of the corresponding traction motor in the vehicular width direction and the drive wheels (16L, 16R) provided at the speed reducers. At least parts of units each of which is formed of one of the speed reducers and the corresponding traction motor are positioned inside the drive wheels.

In this configuration, the travelling components such as the speed reducers and the traction motors are gathered inside the drive wheels. As a result, a reduction in the sizes of the travelling mechanisms formed by combining the travelling components can be achieved. In addition, since the travelling components are gathered on the outer side of the riding-type electric work machine in the vehicular width direction, the maintenance of the travelling mechanisms may be easily performed.

Furthermore, the inner space between the drive wheels in the vehicular width direction can be effectively used as a space in which an installation object other than the travelling components is installed.

The present embodiment discloses the riding-type electric work machine in which each of the housing bases has the outer wall at least a portion of which extends in the vehicular width direction and in which each of the arms slants outward in the vehicular width direction toward the rear side in the vehicular longitudinal direction.

In this case, when the swing arms are attached to the vehicle body frame, each of the housing bases is located on the outer side of the riding-type electric work machine in the vehicular width direction. Thus, the space of the vehicle body frame can be effectively used.

In addition, in the above configuration, the direction of the driving force when the riding-type electric work machine travels forward is a direction toward the inner side in the vehicular width direction. Thus, the stability of the riding-type electric work machine when the riding-type electric work machine turns is improved.

The present embodiment discloses the riding-type electric work machine in which the operating unit is disposed in front of the swing shafts in the vehicular longitudinal direction.

The arms are positioned in front of the travelling components such as the traction motors or the suspensions in the vehicular longitudinal direction. Thus, when the swing shafts are viewed from the front in the vehicular longitudinal direction, the arms shield the traction motors, the suspensions, or the like. In other words, in the vehicular longitudinal direction, the arms are located between the operating unit and the traction motors, the suspensions, or the like. Consequently, in the case where the operating unit is a grass cutting unit, grass cut by the operating unit or sands blown up are less likely to be attached to the traction motors, the suspensions, or the like. As a result, the maintenance of the riding-type electric work machine may be easily performed.

The present embodiment discloses the riding-type electric work machine that includes the travel control unit (132) that controls the traction motors and in which the swing arms include the pair of swing arms arranged at the right part (13R) and the left part (13L) of the vehicle body frame. At least a portion of the travel control unit is located between the pair of swing arms.

In this configuration, the swing shafts and the arms cover the left and right sides of the travel control unit in the vehicular width direction. Thus, the travel control unit can be protected against an obstacle, a flying object, and the like. In addition, an inner space of the vehicle body frame in the vehicular width direction can be effectively used.

The present embodiment discloses the riding-type electric work machine including the drive motors (110*a* to 110*c*) that drive the operating unit and the operating unit controller (134) that controls the drive motors. The operating unit controller is disposed above the travel control unit in the vehicular height direction or is disposed between the pair of swing arms when the riding-type electric work machine is viewed from above.

By gathering and arranging the travel control unit and the operating unit controller at the center of the riding-type electric work machine, both the travel control unit and the operating unit controller can be protected against an obstacle. In addition, the wiring lines connecting the travel control unit to the traction motors and the wiring line connecting the operating unit controller to the operating unit can be reduced in length.

The present embodiment discloses the riding-type electric work machine including the autonomous control unit (170) that autonomously controls the traction motors and the operating unit. The autonomous control unit is disposed above the battery in the vehicular height direction.

In this case, the autonomous control unit is disposed at a relatively upper portion of the riding-type electric work machine in the vehicular height direction.

Consequently, in the case where the operating unit is a lawn mowing unit, entry of grass cut by the operating unit or sands blown up into the autonomous control unit is suppressed.

In the case where an autonomous function is an additional function, the autonomous control unit may be easily mounted onto the riding-type electric work machine. Note that, for example, a travel path along which the riding-type electric work machine is configured to autonomously travel is input to (stored in) the autonomous control unit.

In addition, the grip of the drive wheels is maintained by the suspensions. Thus, the probability that the actual travel path of the riding-type electric work machine will deviate due to slip of the drive wheels or the like from the travel path input to the autonomous control unit is reduced.

The present embodiment discloses the riding-type electric work machine in which the frame side connector (68L) of the vehicle body frame to which the corresponding suspension is coupled overlaps the battery in the side view of the riding-type electric work machine along the vehicular width direction.

By arranging the battery at such a position, transmission of the weight of the battery to the drive wheels in response to the reaction of the riding-type electric work machine to the irregularities on the ground is suppressed. Consequently, the grip of the drive wheels is kept approximately constant. As a result, a slip is prevented from occurring. In addition, tearing up of grass by its roots from the ground is prevented from occurring.

The present embodiment discloses the riding-type electric work machine in which the swing shafts are provided at the front ends of the arms and in which one of the swing arms includes the housing base side connector (94L) connecting one of the suspensions to the corresponding housing base.

According to this configuration, the swing distances of the swing arms are large. Thus, the cushioning property obtained by the swing arms is favorable. In addition, vibrations of the drive wheels, the traction motors, or the like are reduced by the swing arms, and thus, vibration of the riding-type electric work machine can be suppressed.

Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

What is claimed is:

1. A riding-type electric work machine comprising:

a vehicle body frame;

an electrically driven operating unit supported by the vehicle body frame;

a swing arm pivotably supported by the vehicle body frame through a swing shaft;

a traction motor held by the swing arm;

a battery supported by the vehicle body frame and configured to supply electric power to the traction motor and the operating unit; and a suspension coupled to the swing arm and the vehicle body frame, wherein the swing arm comprises: a mounting base for connecting to the traction motor; and a first arm connecting the mounting base to the swing shaft, wherein vehicle body frame includes an arm connector tab protruding downward from a bottom face of the vehicle body frame, the swing shaft of the swing arm is pivotably connected to the arm connector tab, the riding-type electric work machine further comprises a travel control unit configured to control the traction motor, wherein the swing arm comprises a right swing arm and a left swing arm disposed respectively on right and left of the vehicle body frame, and at least a part of the travel control unit is interposed between the right swing arm and the left swing arm, the arm connector tab comprises a right arm connector tab and a left arm connector tab disposed respectively on right and left of the vehicle body frame, at least a part of the travel control unit is interposed between the right arm connector tab and the left arm connector tab such that the travel control unit is covered by the right arm connector tab and the right swing arm in a right-side view of the riding-type electric work machine.

2. The riding-type electric work machine according to claim 1, wherein the swing shaft and the mounting base are disposed at different positions along a vehicular longitudinal direction of the riding-type electric work machine, the first arm extends from the swing shaft toward the mounting base, and the battery protrudes downward from the vehicle body frame, at least a part of the battery being interposed between the right swing arm and the left swing arm.

3. The riding-type electric work machine according to claim 1, further comprising:

a speed reducer disposed outward of the traction motor in a vehicular width direction and coupled to the traction motor; and a drive wheel provided to the speed reducer, wherein at least a part of a unit composed of the speed reducer and the traction motor is disposed inside the drive wheel.

4. The riding-type electric work machine according to claim 1, wherein the mounting base has a cylindrical shape, the first arm slants outward in the vehicular width direction as the first arm approaches a rear of the riding-type electric work machine.

5. The riding-type electric work machine according to claim 1, wherein the operating unit is disposed at a front of the swing shaft in the vehicular longitudinal direction.

6. The riding-type electric work machine according to claim 1, further comprising:

a drive motor configured to drive the operating unit; and an operating unit controller configured to control the drive motor, wherein the operating unit controller is disposed above the travel control unit in a vehicular height direction.

7. The riding-type electric work machine according to claim 1, further comprising:

an autonomous control unit configured to autonomously control the traction motor and the operating unit.

8. The riding-type electric work machine according to claim 1, wherein a frame side connector by which the suspension is connected to the vehicle body frame overlaps the battery in a side view of the riding-type electric work machine.

9. The riding-type electric work machine according to claim 1, wherein the swing shaft is disposed on a front end of the first arm, and the swing arm comprises a mounting base side connector by which the suspension is connected to the mounting base.

10. The riding-type electric work machine according to claim 4, wherein the first arm slants outward in the vehicular width direction such that the mounting base is located on outside of the vehicle body frame in the vehicular width direction in a plan view of the riding-type electric work machine.

11. The riding-type electric work machine according to claim 2, wherein the at least a part of the battery is interposed between the right swing arm and the left swing arm in a vehicular width direction.

12. The riding-type electric work machine according to claim 2, wherein the vehicle body frame includes a right frame extended along the vehicular longitudinal direction and a left frame extended along the vehicular longitudinal direction, and the battery is interposed between the right frame and the left frame in a vehicular width direction.

13. The riding-type electric work machine according to claim 1, wherein the at least a part of the travel control unit is interposed between the right swing arm and the left swing arm in a vehicular width direction.

14. The riding-type electric work machine according to claim 6, wherein the operating unit controller is disposed above the travel control unit to cover the travel control unit.

15. A riding-type electric work machine comprising:

a vehicle body frame;

an electrically driven operating unit supported by the vehicle body frame;

a swing arm pivotably supported by the vehicle body frame through a swing shaft, wherein vehicle body frame includes an arm connector tab protruding downward from a bottom face of the vehicle body frame, the swing shaft of the swing arm is pivotably connected to the arm connector tab, the swing arm comprising a right swing arm and a left swing arm disposed respectively on right and left sides of the vehicle body frame;

a battery supported by the vehicle body frame and configured to supply electric power to the operating unit; and a suspension coupled to the swing arm and the vehicle body frame; wherein the battery protrudes downward from the vehicle body frame, and at least a part of the battery is interposed between the right swing arm and the left swing arm, wherein the riding-type electric work machine further comprises a travel control unit disposed in front of the battery, at least a part of the travel control unit is interposed between the right swing arm and the left swing arm, the arm connector tab comprises a right arm connector tab and a left arm connector tab disposed respectively on right and left of the vehicle body frame, at least a part of the travel control unit is interposed between the right arm connector tab and the left arm connector tab such that the travel control unit is covered by the right arm connector tab and the right swing arm in a right side view of the riding-type electric work machine.

16. The riding-type electric work machine according to claim 15, further comprising:

an autonomous control unit configured to autonomously control the traction motor and the operating unit.

17. The riding-type electric work machine according to claim 15, further comprising:

a traction motor held by the swing arm; and wherein the travel control unit is configured to control the traction motor.

18. The riding-type electric work machine according to claim 17, further comprising:

a drive motor configured to drive the operating unit; and an operating unit controller configured to control the drive motor;

wherein the operating unit controller is disposed above the travel control unit in a vehicular height direction.

19. The riding-type electric work machine according to claim 18, further comprising:

an autonomous control unit configured to autonomously control the traction motor and the operating unit.

20. A riding-type electric work machine comprising:

a vehicle body frame;

an operating unit supported by the vehicle body frame;

a swing arm pivotably supported by the vehicle body frame through a swing shaft;

a traction motor held by the swing arm;

a battery supported by the vehicle body frame and configured to supply electric power to the traction motor; and a drive wheel;

wherein the swing arm comprises a mounting base for mounting the traction motor, and a speed reducer is disposed outward of the traction motor in a vehicular width direction and coupled to the traction motor; and at least a part of a unit composed of the speed reducer and the traction motor is disposed inside the drive wheel, wherein vehicle body frame includes an arm connector tab protruding downward from a bottom face of the vehicle body frame, the swing shaft of the swing arm is pivotably connected to the arm connector tab, the riding-type electric work machine further comprises a travel control unit configured to control the traction motor, wherein the swing arm comprises a right swing arm and a left swing arm disposed respectively on right and left of the vehicle body frame, and at least a part of the travel control unit is interposed between the right swing arm and the left swing arm, the arm connector tab comprises a right arm connector tab and a left arm connector tab disposed respectively on right and left of the vehicle body frame, at least a part of the travel control unit is interposed between the right arm connector tab and the left arm connector tab such that the travel control unit is covered by the right arm connector tab and the right swing arm in a right side view of the riding-type electric work machine.

21. The riding-type electric work machine according to claim 18, wherein at least a part of the battery is interposed between the right swing arm and the left swing arm.

22. The riding-type electric work machine according to claim 21, further comprising:

an autonomous control unit configured to autonomously control the traction motor and the operating unit.

* * * * *